Oct. 16, 1928.
J. G. GRÖNDAL
1,687,760
METHOD AND APPARATUS FOR HANDLING BITUMINOUS MATERIALS
Filed Nov. 5, 1925     4 Sheets-Sheet 2
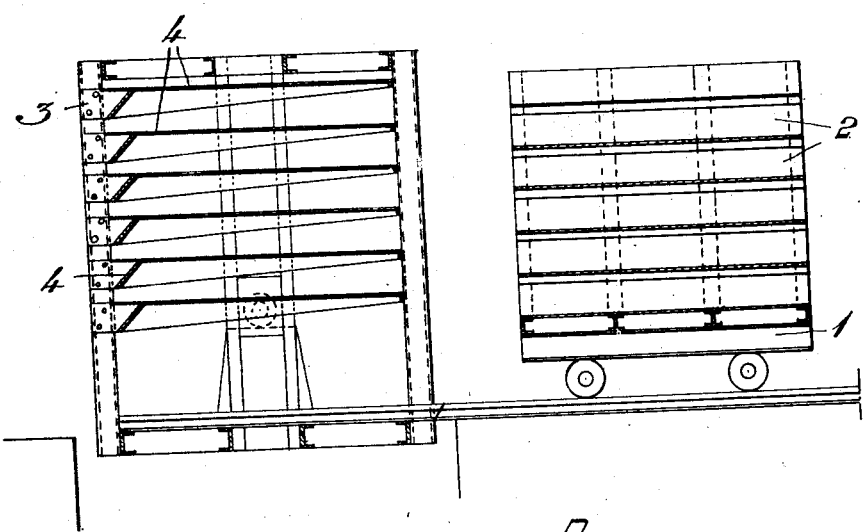
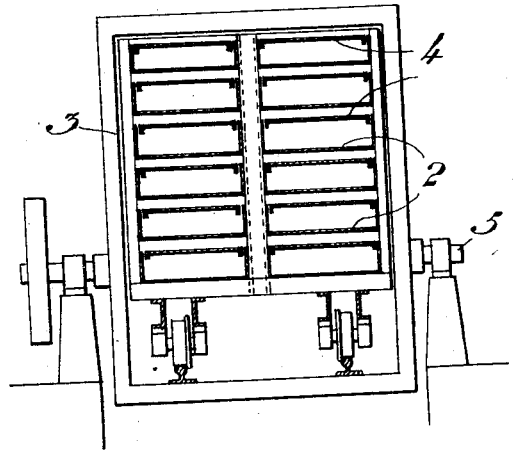
Inventor
Johan Gustaf Gröndal
per
Attorney.

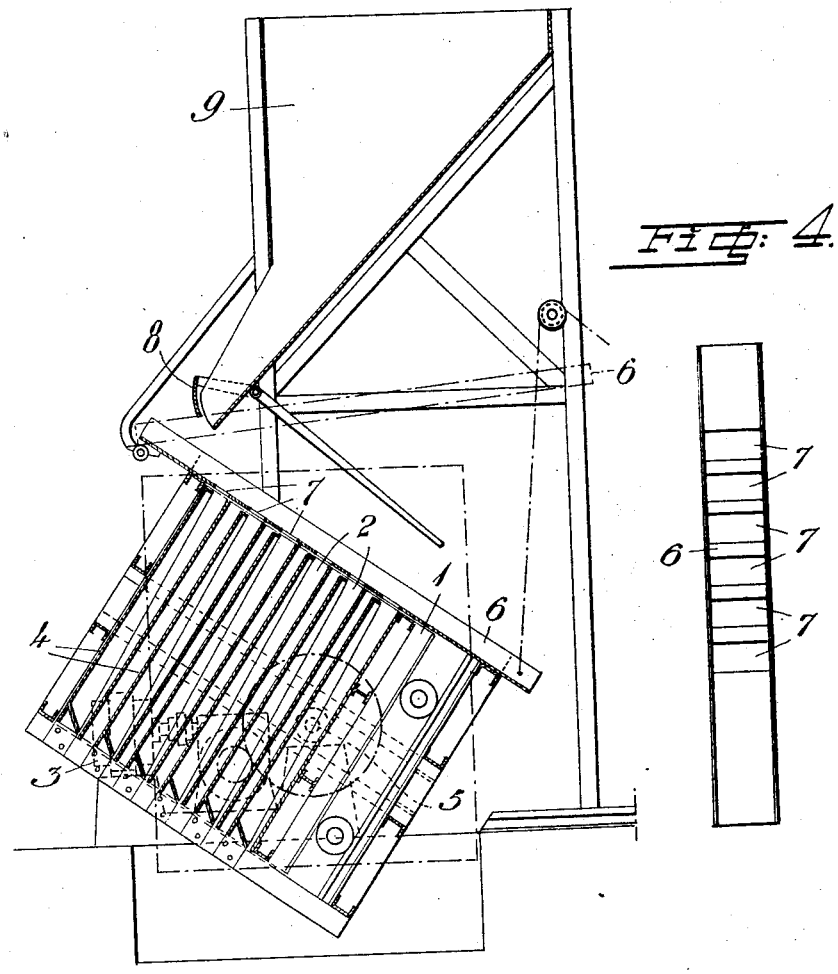

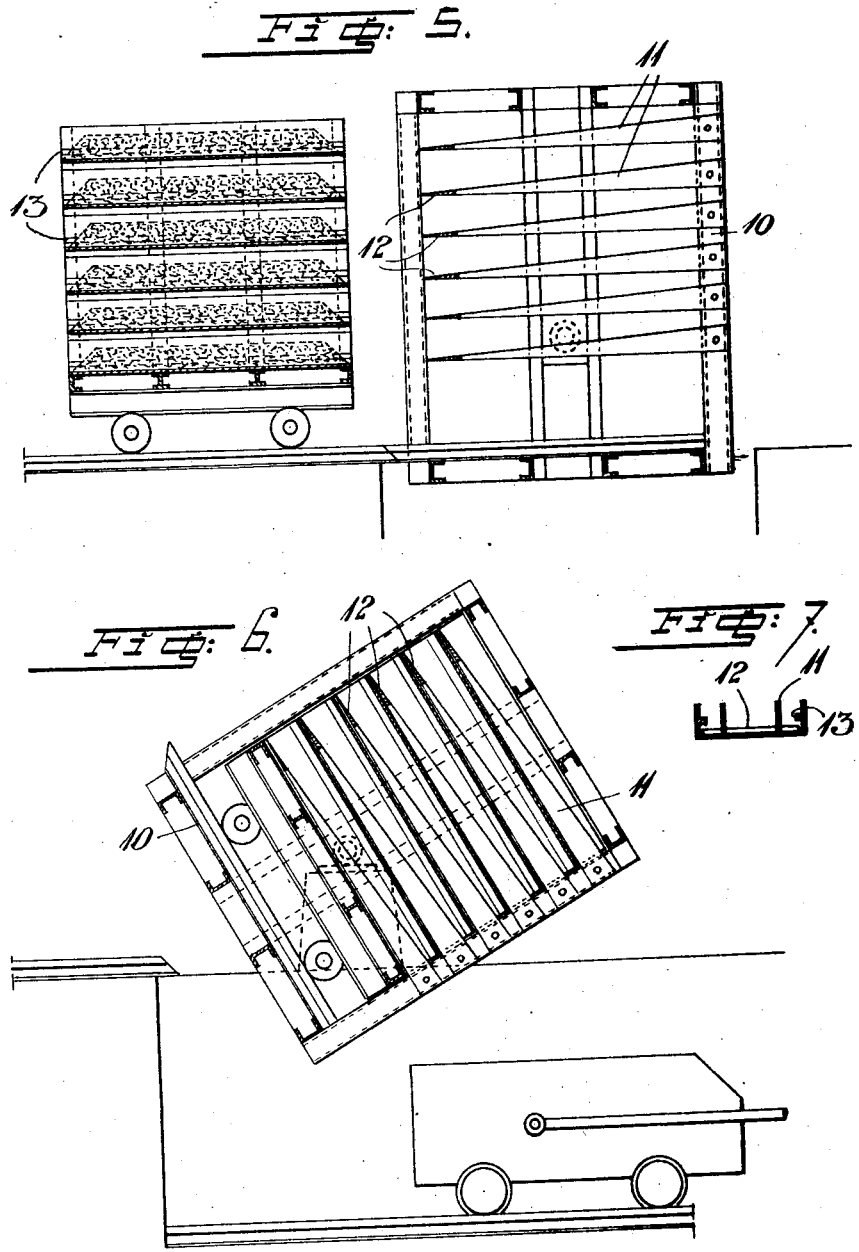

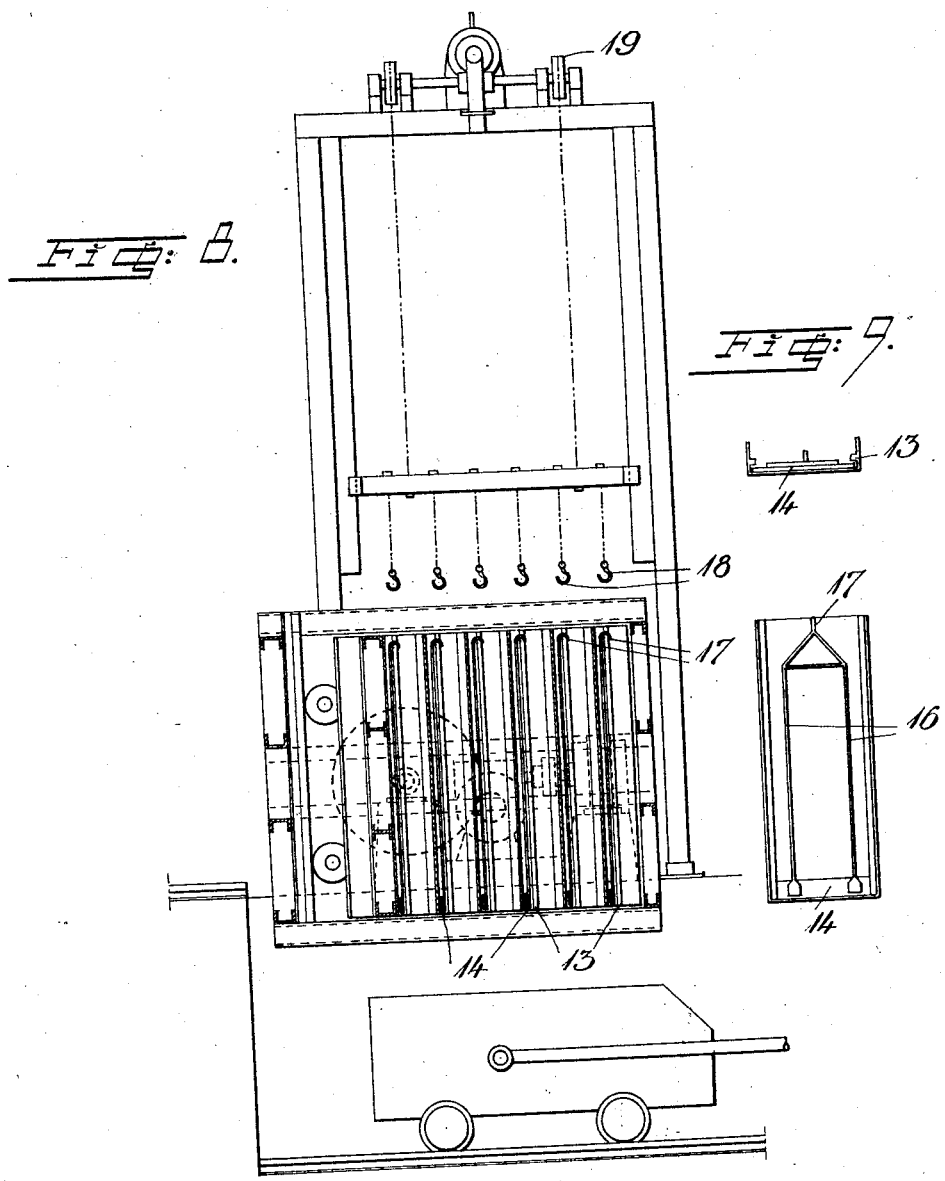

Patented Oct. 16, 1928.

1,687,760

UNITED STATES PATENT OFFICE.

JOHAN GUSTAF GRÖNDAL, OF DJURSHOLM, SWEDEN.

METHOD AND APPARATUS FOR HANDLING BITUMINOUS MATERIALS.

Application filed November 5, 1925, Serial No. 67,006, and in Sweden April 6, 1925.

At the dry distillation by means of exterior heating of bituminous materials, such as schists or brown coal, which materials on account of their low heat conducting power ought to be heated in thin layers, the material to the distilled may be charged in containers, for instance trays, piled up one upon the other on trucks or the like and permitting the thickness of the layers to be suited to the quality of the material. A reduction of the thickness of the layers, however, necessitates an increase in the number of trays and of the cost of their charging, piling up, removal and discharging, and the object of the present invention is to reduce that labour and at the same time to avoid the labour connected to the removal of the containers from the trucks during the treatment of the material.

In the accompanying drawings Fig. 1 illustrates a vertical section of the apparatus used at the charging of the containers or trays and also of an inclined truck with such containers, ready for charging; Fig. 2 is a vertical cross section of an upright truck with two piles of containers, Fig. 3 a side elevation, partly in section of the charging apparatus and a truck on the way to same, and Fig. 4 a front view of a gutter to be used for feeding the material in the containers of the apparatus. Fig. 5 illustrates a vertical section of a loaded truck on its way to the discharge apparatus, shown in vertical section, Fig. 6 a vertical section of the said apparatus in position for discharging and a side elevation of a receiving truck for the material discharged, Fig. 7 a vertical cross section of a cutting device, belonging to the discharge apparatus and adapted to the disengagement of the material from the bottom of the containers, Fig. 8 a modified constructional form of the discharging apparatus in front view with a discharged container frame in vertical section and Fig. 9 an end view as well as a plan view of the disengaging device, appropriated to that form of the apparatus.

The charging or loading apparatus consists of a cage or frame work 3 turning on horizontal stationary pivots 5; in the one side of the said cage a number of plates 4 are fixed the one above the other and all extending over the whole length of the cage, forming covers to each corresponding, in both ends open container or tray 2, piled up in one or more groups upon the truck or car 1, and also closing the one end of said containers after their introduction in the cage (Fig. 1). At the charging or loading operation the truck with the unfilled containers, piled up on same, is carried against and into the cage 3 (Fig. 3, 1), whereby each container 2 will be covered by the corresponding covers 4 leaving only the one end of each container open. The cage by means of some suitable device is then turned on its pivots 5 to the inclined position, illustrated in Fig. 1, and two gutters 6 arranged one above each pile of containers on the truck (if there are two such piles) are turned from their upper position (shown with dotted lines in Fig. 1) down above the open ends of the containers in each of the piles. Only one or more than two piles of containers may of course be used. The gutters 6 are provided with openings 7, corresponding to the open ends of the containers in their lower position. When a shutter 8 is opened the material from a higher situated pocket 9 falls down in all the containers 2 between their bottoms and covers. After the charging of the containers the shutter 8 is closed, the gutters 6 raised and the cage turned back to the upright position, illustrated in Fig. 3. The truck and the containers is now moved out from the cage and brought to the oven, where the dry distillation process takes place. The amount of material on each tray is predetermined by the cover of the tray, as the cover limits the amount of material fed into the compartment formed by the tray 2 and its cover 4 from the gutters 6. In other words, when these compartments are filled, a predetermined amount of material will be deposited on each tray. After the said process the truck with the containers is brought to the discharge station, where it is unloaded. Because a bituminous material easily sticks to the bottom of the containers at the distillation process it will be suitable to use at the discharge an apparatus, which is principally similar to the cage already described for the charging but differs from that apparatus therein that the covers 4 of the charging apparatus are replaced by means for removing the material sticking in the container bottoms at the distillation. The discharging apparatus consists of a cage or frame work 10 (Figs. 5, 6), turning on pivot and containing a number of thin strips or plates 11, fixed at the one side of the frame work and extending to the other side, facing to the direction of the truck moving from the distilling oven. The fore ends of these strips or plates 11 are connected to one another by a horizontal plate 12, shaped as a knife and having such a position, that it will slip upon the bottom of a corresponding container of the truck, charged with the treated material, when that truck is introduced in the frame work 10. The contents of the containers thus may be disengaged and discharged into a truck or car, placed below, if the frame work is turned in an angle of 60°—90° as illustrated in Fig. 6. Guides 13 for the cutting plates 12 suitably may be arranged on the inside of the container walls (Fig. 7). After the discharge the frame work 10 is turned to its upright position and the truck with the empty containers is moved back from the frame work to the charging apparatus.

In the modified constructional form illustrated in Fig. 8 the cutting or knife plates 12 of the frame work are replaced by movable cross plates 14, arranged at the fore end of the bottom of each container and by means of arms 16 connected to a corresponding clamp 17 or the like at the back end of the corresponding container, against which back end the cutting edge of the plate is turned. When the truck is to be discharged and is pushed into the frame work, the latter is turned into the position represented in Fig. 8, and chains or rods 18, connected to a lifting device 19, are hooked in the clamps 17. By means of the said lifting device the plates 14 may be moved along the bottoms of the containers, thereby disengaging the material which has stuck to the bottoms, so that it drops in the truck or car below. When the containers are thus discharged, the lifting device is lowered so that the plates 14 are brought back to their position at the fore end of the containers, whereupon the clamps 17 are released from the lifting chains or rods 18, the frame work is turned in upright position and the truck brought back to the charging apparatus to be charged again.

Having now particularly described the nature of my invention and the manner of its operation, what I claim is:

1. Method of handling bituminous materials in connection with the dry distillation thereof, comprising feeding the material from a container to form a series of separate inclined layers spaced from each other, swinging the series of layers to substantially horizontal position, transporting the so spaced and superposed layers, and finally tilting and discharging such layers of material after treatment.

2. Method of handling bituminous materials in connection with the dry distillation thereof, comprising feeding the material from a container to form a series of separate inclined layers spaced from each other, swinging the series of layers to substantially horizontal position, transporting the so spaced and superposed layers, tilting the series of layers after treatment, and finally scraping the treated material from the spaced surfaces carrying such tilted layers of treated material.

3. Method of handling bituminous materials in connection with the dry distillation thereof, comprising feeding the material from a container, distributing the material to form a series of layers of pre-determined thickness, arranged parallel to each other and disposed at an angle to the horizontal, swinging the said layers simultaneously to the horizontal position, transporting the layers thus superposed in spaced relation to each other, and simultaneously discharging all the layers of each series after treatment of the material.

4. Method of handling bituminous materials for the dry distillation thereof by forming a series of superposed layers spaced from each other, comprising forming the layers in an inclined position in properly spaced relation, swinging the spaced layers to the horizontal position for transportation to the treating station, and discharging the treated material from the series of layers by tilting and scraping the material from its spaced supporting surfaces.

5. Method of handling bituminous materials for the dry distillation thereof, comprising distributing the material to a series of parallel layers uniformly spaced from each other and inclined to the horizontal, forming a series of layers, swinging the said layers to the horizontal position, transporting the layers in their original spaced relation preparatory to the treatment of the material, transporting the layers of treated material, swinging the series of spaced layers to an inclined position and finally discharging the treated material from the inclined layers.

6. Apparatus for handling bituminous materials in connection with the dry distillation thereof, comprising a carriage, surfaces on the carriage for supporting at least one series of superposed layers of material in spaced relation to each other, a guide structure including at least one series of guide members adapted to cooperate with the said supporting surfaces on the carriage to form material receiving spaces, means for swinging the carriage and guide structure to an inclined position and for subsequently returning the carriage to the horizontal position with the superposed layers of material on its surfaces, means for supplying the material to the said series of spaces when so inclined, and means for finally tilting the carriage and removing the layers of treated material from the said surfaces.

7. Apparatus for handling bituminous materials in connection with the dry distillation thereof, comprising a carriage with superposed spaced surfaces for the reception of the material, means for supplying layers of material to the said surfaces, comprising a supply hopper and distributing means common to all the surfaces, and means whereby the material is discharged from the carriage after treatment, comprising means for tilting the carriage, and means for simultaneously scraping the treated material from all the surfaces.

JOHAN GUSTAF GRÖNDAL.